United States Patent [19]

Sakakibara

[11] 4,387,607
[45] Jun. 14, 1983

[54] OVERDRIVE UNIT IN AUTOMATIC TRANSMISSIONS

[75] Inventor: Shiro Sakakibara, Aichi, Japan

[73] Assignee: Aisin Warner Kabushiki Kaisha, Aichi, Japan

[21] Appl. No.: 179,484

[22] Filed: Aug. 19, 1980

[30] Foreign Application Priority Data

Aug. 30, 1979 [JP] Japan .................. 54-111262

[51] Int. Cl.³ ............................ F16H 57/10
[52] U.S. Cl. ......................... 74/781 R; 74/763
[58] Field of Search ............ 74/762, 763, 781

[56] References Cited

U.S. PATENT DOCUMENTS

| | | | |
|---|---|---|---|
| 2,681,126 | 6/1954 | Searls | 74/781 R |
| 3,477,313 | 11/1969 | Ringe | 74/781 R X |
| 3,780,601 | 12/1973 | Dach et al. | 74/762 |
| 4,152,957 | 5/1979 | Watanabe et al. | 74/781 R X |

Primary Examiner—Allan D. Herrmann
Attorney, Agent, or Firm—Oblon, Fisher, Spivak, McClelland & Maier

[57] ABSTRACT

An overdrive unit in an automatic transmission having a planetary gear set including a helical gear and a thrust bearing interposed between the sun gear and revolving carrier for supporting any thrust loads produced between the sun gear and the carrier, thereby reducing the amount of any external force to be exerted on the outer race of the one-way clutch and thus improving the durability of the one-way clutch.

1 Claim, 3 Drawing Figures

OVERDRIVE UNIT IN AUTOMATIC TRANSMISSIONS

BACKGROUND OF THE INVENTION

1. Field of the Invention

The present invention relates generally to an overdrive unit to be mounted in an automatic transmission for vehicles, and more particularly to improving the durability of the overdrive unit.

2. Description of the Prior Art

The overdrive unit of the conventional type is shown in FIG. 1, and essentially comprises a planetary gear set which includes a revolving carrier 10 secured to an input shaft 9 which is also an output shaft for a torque converter, a planetary pinion up rotatably supported on the carrier 10, a sun or central gear 11 in mesh with the planetary pinion 14, and a ring gear 15 in mesh with the planetary pinion and connected to the output shaft 23 of the overdrive unit, and a multi-plate brake assembly 19 interposed between the sun gear 11 and the casing 16 of the overdrive unit. It is known that the planetary gear set also includes helical gears and that when torque is transmitted between the input shaft 9 and output shaft 23, a thrust is produced between the toothed surfaces in mesh of the helical gears. Therefore, the prior art overdrive unit has a thrust bearing 41 interposed between the end face of a sleeve 40 inserted between the input shaft 9 and casing 16, and one side of the sun gear 11, and a further thrust bearing 42 interposed between the rim 15A of the ring gear 15 connecting the ring gear and the output shaft and the casing 16. In the above arrangement of the prior art, the thrust bearing 41 supports any forward directed thrust exerted on the sun gear 11, and the thrust bearing 42 supports any rearwardly-directed thrust which is transmitted as indicated by an arrow A through a connections 12B between the drum 12A of the hydraulic power cylinder for the multi-plate clutch 12 and the sun gear 11, the spacer 45, the outer race 13A of the one-way clutch 13, the carrier 10, the ring gear rim 15A and the metal sheets inserted between the above-mentioned elements, and is exerted on the sun gear 11. In order to maintain the one-way clutch 13 under the optimum operating condition and provide a higher durability for the clutch, however, it is desirable to minimize any external force that may be exerted on the one-way clutch 13.

SUMMARY OF THE INVENTION

An object of the present invention is to provide an overdrive unit for the automatic transmission which can minimize any external force that may be exerted on the outer race of the one-way clutch 13, thereby providing the one-way clutch with higher durability.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 2:
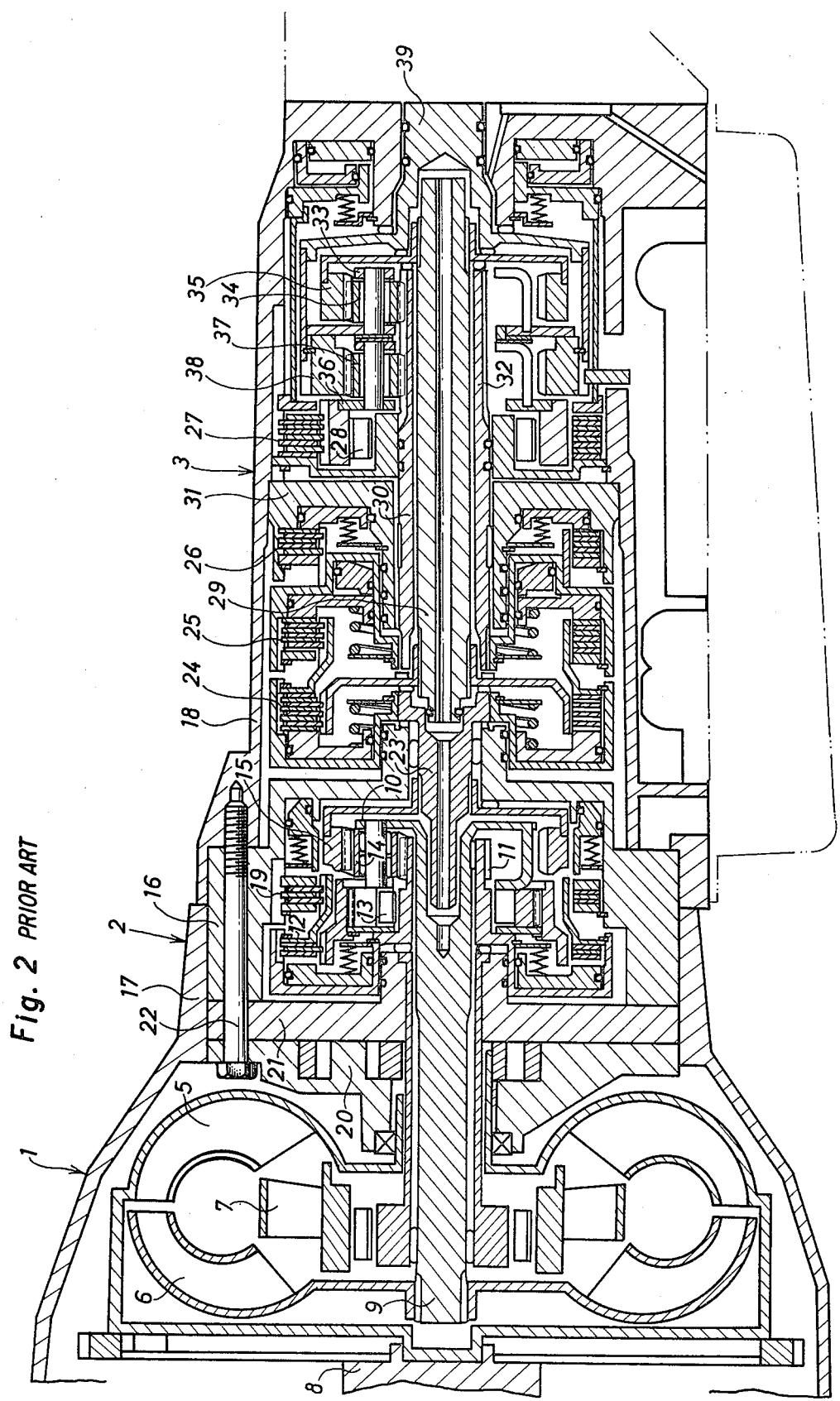
FIG. 2 is a schematic diagram illustrating the construction of the automatic transmission in which the overdrive unit of the present invention is to be incorporated.

Referring first to FIG. 2, there is shown a longitudinal sectional view of one example of the automatic transmission for vehicles in which the embodiment of the present invention is to be incorporated. To aid in understanding the overdrive unit according to the present invention, the general construction of the automatic transmission of the type in which the overdrive unit is to be included is described below.

The automatic transmission includes a torque converter 1, overdrive unit 2, auxiliary shifter 3 which provides three forward speeds and one reverse, and hydraulic control system.

The torque converter 1 comprises a pump 5, turbine 6 and stator 7 and is well known per se. The pump 5 is connected to an engine crankshaft 8, and a turbine 6 is secured to its turbine axis 9. The turbine axis 9 provides both an output shaft for the torque converter 1, and an input shaft for the overdrive unit 2, the input shaft being secured to a revolving carrier 10 in the planetary gear set in the overdrive unit 2. A planetary pinion 14 rotatably supported on the carrier 10 is in mesh with a sun gear 11 and a ring gear 15. Interposed between the sun gear 11 and carrier 10 are a multiplate clutch 12 and a one-way clutch 13. There is provided a multiplate brake 19 between the sun gear 11 and an overdrive casing 16 in which the overdrive unit is accommodated.

The torque converter 1 has a housing 17 which accommodates the pump 5, turbine 6, stator 7 and other required elements therein. The auxiliary shifter 3 has a transmission case 18 in which are arranged a planetary gear set, clutch and brake which are later to be described. The two casings or housings 17 and 18 are joined together along the connections by means of bolt joints (not shown). The overdrive casing 16 is joined by means of a bolt 22 with the transmission case 18 together with an oil pump housings 20, 21 having an oil pump gear therein. For assembling the above elements together, the overdrive casing 16 and oil pump housings 20, 21 are first joined together by means of the bolt 22, and then the torque converter 17 is joined with the above subassembly so that the torque converter casing 17 is combined with the transmission case 18 of that subassembly by means of a bolt (not shown).

The ring gear 15 in the overdrive unit 2 is linked to the output shaft 23 for the overdrive unit which also provides the input shaft for the auxiliary shifter 3. A multiplate clutch 24 is mounted between the output shaft 23 and counter or intermediate shaft 29, and a multiplate clutch 25 is installed between the output shaft 23 for the overdrive unit and sun gear axis 30. There is a multiplate brake 26 between the sun gear axis 30 and a support 31 rigidly fixed to the transmission case 18. The sun gear 32 integral with the sun gear axis 30 has two planetary gear sets, one consisting of a revolving carrier 33, a planetary pinion 34 rotatably supported on the carrier 33 and a ring gear 35 in mesh with the pinion, and the other consisting of a revolving carrier 36, a planetary pinion 37 rotatably supported on the carrier 36 and a ring gear 38 in mesh with the pinion. The ring gear 35 in the first planetary gear set is linked to the countershaft 29. The carrier 33 in the first gear set is linked to the ring gear 34 in the second gear set, those carrier 33 and ring gear 34 being coupled to the output shaft 39. There are a multiplate brake 27 and a one-way clutch 28 between the carrier 36 in the second gear set and the transmission case 17.

The auxiliary shifter 3 contains the hydraulic control system at the lower portion thereof. The hydraulic control system includes a plurality of valves which are actuated in response to changes in the engine output and vehicle speeds in order to perform the switching operation for engaging or disengaging each clutch and each brake, and to permit the transmission to automatically shift through its four forward ranges including overdrive (O.D), and one reverse.

The shift gear positions and the associated clutch and brake operations are given in Table 1.

TABLE 1

| Shift position | Friction Engaging Elements | | | | | | | |
|---|---|---|---|---|---|---|---|---|
| | clutch | | | brake | | | one-way clutch | |
| | 12 | 24 | 25 | 19 | 26 | 27 | 13 | 28 |
| Parking | o | x | x | x | x | o | lock | |
| Reverse | o | x | o | x | x | o | lock | lock |
| Neutral | o | x | x | x | x | x | lock | |
| Forward | | | | | | | | |
| D-range | | | | | | | | |
| 1st | o | o | x | x | x | x | lock | lock |
| 2nd | o | o | x | x | o | x | lock | overrun |
| 3rd | o | o | o | x | x | x | lock | overrun |
| O-D | x | o | o | o | x | x | overrun | overrun |
| 2-range | | | | | | | | |
| 1st | o | o | x | x | x | x | lock | lock |
| 2nd | o | o | x | x | o | x | lock | overrun |
| L-Range | o | o | x | x | x | o | lock | lock |

In the above table, the symbol (o) indicates that the appropriate clutches and brakes are in the engaged state, respectively, and the symbol (x) signifies that the appropriate clutches and brakes are in the disengaged state.

Figure 1:
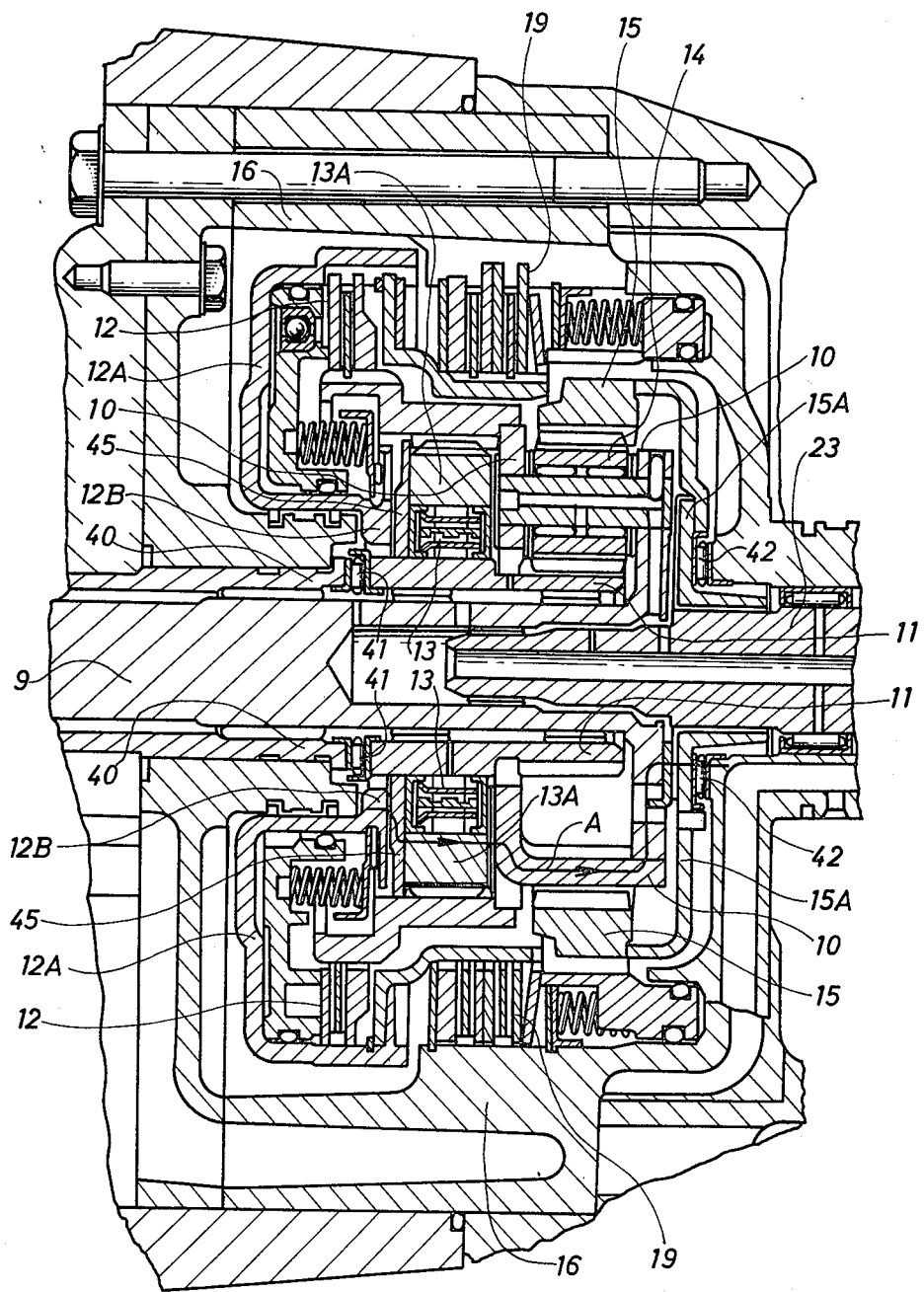
FIG. 1 is a sectional view of the prior art overdrive unit.
Figure 3:
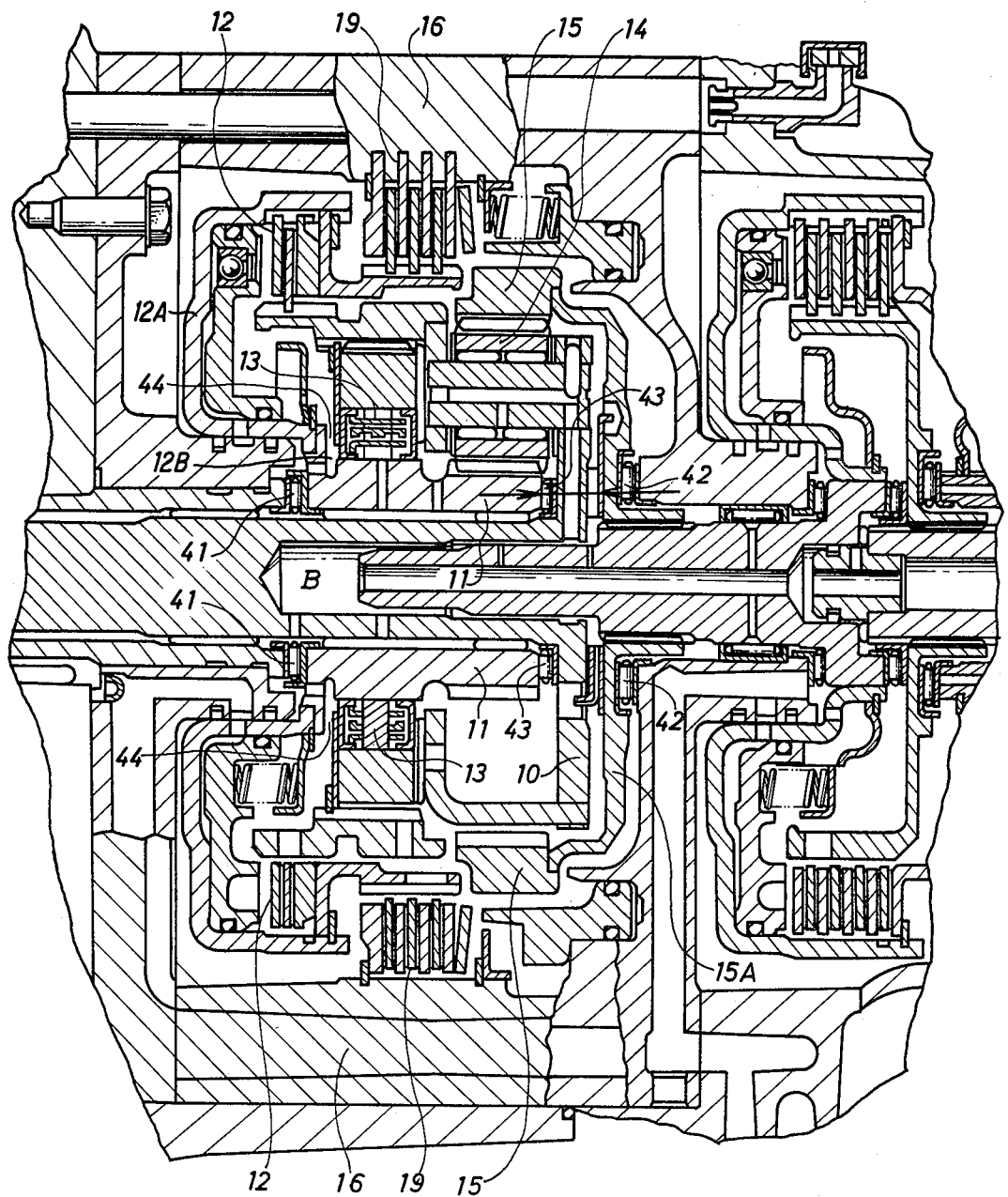
FIG. 3 is an enlarged view of the present invention showing the overdrive unit portion in FIG. 2.

FIG. 3 illustrates, on an enlarged scale, the overdrive unit portion according to the present invention in the automatic transmission shown in FIG. 2, the corresponding parts or elements in FIGS. 1 and 3 having been given corresponding reference numerals in FIG. 3. In accordance with the present invention, a gap or clearance 44 is defined between a connection portion 12B which links the drum 12A of the hydraulic power cylinder for the multiplate clutch 12 to the sun gear 11, and the one-way clutch 13, and a thrust bearing 43 is interposed between the rear side of the sun gear 11 and the revolving carrier 10.

The presence of such thrust bearing 43 between the rear end of the sun gear 11 and the carrier 10 permits any rearwardly directed thrust exerted on the sun gear 11 to be transmitted as indicated by an arrow B through thrust bearing 43, carrier 10, ring gear rim portion 15A and thrust bearing 42 and to be supported by the overdrive casing 16. Thus, the above arrangement including the gap 44 can prevent the rearwardly-directed thrust from being directly applied as an external force to the one-way clutch 13.

It will clearly be seen from the foregoing description that the overdrive unit according to the present invention presents the advantages of minimizing the amount of the external force applied to the one-way clutch and thereby improving the durability of the one-way clutch since the thrust bearing is provided between the sun gear and the revolving carrier.

Although the present invention has been described with reference to the preferred embodiment thereof, it should be understood that various changes and modifications may be made without departing from the spirit and scope of the invention.

What is claimed as new and desired to be secured by Letters Patent of the United States is:

1. An overdrive apparatus in an automatic transmission comprising:
    a planetary gear set including a sun gear, a ring gear and at least one planetary pinon in mesh with the sun gear and the ring gear;
    an input shaft concentrically linked with a rotating carrier supporting the planetary pinion;
    an output shaft concentrically linked with the ring gear;
    a first clutch disengageably coupling the sun gear with the carrier including a first and second clutch hub, said first clutch hub being concentrically linked with the carrier and the second clutch hub being rotatable together with the sun gear;
    a brake disposed between the housing of the overdrive apparatus and the second clutch hub;
    a one-way clutch between the sun gear and the carrier for overrunning the rotating carrier when the sun gear is braked, said clutch having inner and outer races, one of which being loosely splined with a clutch hub secured to the carrier; and
    thrust bearing means interposed between the sun gear and the revolving carrier for supporting any thrust load produced between the sun gear and the revolving carrier wherein a gap is formed between the one-way clutch and the connection portion between the sun gear and the second clutch hub of the brake.

* * * * *